United States Patent
Huang et al.

(10) Patent No.: US 8,268,272 B2
(45) Date of Patent: Sep. 18, 2012

(54) METHOD FOR REMOVING VINYL MONOMERS FROM A GAS STREAM

(75) Inventors: Wu-Jang Huang, Pingtung (TW);
Ling-Yin Chang, Pingtung (TW);
Yen-Chia Liu, Kaohsiung (TW);
Hsiu-Hsien Wu, Pingtung (TW);
Yi-Ching Li, Pingtung (TW)

(73) Assignee: National Pingtung University Of Science & Technology, Neipu Hsiang, Pingtung County (TW)

( * ) Notice: Subject to any disclaimer, the term of this patent is extended or adjusted under 35 U.S.C. 154(b) by 0 days.

(21) Appl. No.: 13/275,874

(22) Filed: Oct. 18, 2011

(65) Prior Publication Data
US 2012/0035295 A1 Feb. 9, 2012

Related U.S. Application Data

(62) Division of application No. 12/402,092, filed on Mar. 11, 2009, now abandoned.

(30) Foreign Application Priority Data

Nov. 4, 2008 (TW) ............................. 97142586 A

(51) Int. Cl.
*B01D 47/00* (2006.01)
*B01D 53/46* (2006.01)
*B01D 53/56* (2006.01)
*B01D 53/86* (2006.01)
*B01D 53/02* (2006.01)
*B01J 8/00* (2006.01)
*A61L 24/00* (2006.01)
*C08F 2/00* (2006.01)

(52) U.S. Cl. ..................... 423/210; 423/245.1; 522/184; 522/186

(58) Field of Classification Search ........................ None
See application file for complete search history.

(56) References Cited

U.S. PATENT DOCUMENTS

| | | | |
|---|---|---|---|
| 3,480,553 A * | 11/1969 | Feller et al. | 252/62.54 |
| 3,635,750 A * | 1/1972 | Wright | 428/336 |
| 4,133,663 A | 1/1979 | Skinner | |
| 5,558,746 A | 9/1996 | Best | |
| 2003/0000824 A1 | 1/2003 | Taoda et al. | |
| 2008/0265179 A1 | 10/2008 | Havens et al. | |
| 2009/0180934 A1 | 7/2009 | Khoshbin | |

FOREIGN PATENT DOCUMENTS

TW 446572 7/2001

* cited by examiner

*Primary Examiner* — Jill Warden
*Assistant Examiner* — Charles D Hammond
(74) *Attorney, Agent, or Firm* — Muncy, Geissler, Olds & Lowe, PLLC

(57) ABSTRACT

A method for removing vinyl monomers from a gas stream comprises steps of: irradiating a photoactive-inorganic medium by a light emitting unit to activate the photoactive-inorganic medium; and pumping a gas stream including vinyl monomers to contact with the activated photoactive-inorganic medium to make the vinyl monomers in the gas stream to polymerize on the photoactive-inorganic medium to jointly form a polymeric nano-composite.

11 Claims, 7 Drawing Sheets

METHOD FOR REMOVING VINYL MONOMERS FROM A GAS STREAM

This is a divisional application of U.S. patent application Ser. No. 12/402,092 filed on Mar. 11, 2009 now abandoned.

FIELD OF THE PRESENT INVENTION

The present invention relates to a method for the treatment of exhaust gas and, more particularly, to a method for removing vinyl monomers from a gas stream.

BACKGROUND OF THE INVENTION

Generally, there are three chemical reactors in chemical engineering, which are continuous stirred-tank reactor (CSTR), plug flow reactor (PFR) and pack-bed reactor (PBR). According to aspects of chemical engineering applications, these reactors are packed with catalysts and are often equipped with different units, such as a thermostat. Hence, a diversity of chemical reactors is designed. Key process variables for the design of a chemical reactor include flow rate, temperature, concentrations of chemical species, pressure and so on. Furthermore, the following are advantages and disadvantages of different kinds of chemical reactors.

First, the CSTR is most used in industry and can be run steadily, with reagents inside a reaction tank of the CSTR being well mixed. Additionally, several CSTRs in series use will be operated for economic benefit. However, in all kinds of continuous flowing reactors, CSTR has a lowest volumetric unit of conversion and that leads to the necessity of a reaction tank with large volume to enhance volumetric unit conversion.

The PFR, which is constructed by a single tube or many tubes in parallel, is suitable for a gas fluid. It has a high volumetric unit conversion, which is the highest in all kinds of continuously flowing reactors, and can run for long periods of time without maintenance. Disadvantages of plug flow reactors are that temperatures are hard to control due to exothermic reactions and can result in undesirable temperature gradients.

The PBR has the highest volumetric unit of conversion in all kinds of catalytic reactors. However, it is also hard to control temperature of the PBR and to replace material of a catalyst packed in the PBR.

Moreover, in order to remove organic compounds from a waste gas stream, there is an adsorbent in an absorption tower that is an example of a conventional apparatus for treating exhaust, such as active carbon. Activated carbon is a selective adsorbent, which doesn't adsorb polar material like water but does adsorb non-polar organic compounds with high molecular weights, because of its non-polarity. After adsorbing organic compounds, activated carbon can be disposed in landfill with or without incineration process, or recovered. Recovered activated carbon is regenerated by heat, vacuum desorption or stripping desorption to reuse.

Nevertheless, said conventional apparatus for treating exhaust has several drawbacks. The organic compounds are easily released from the activated carbon when environmental factors, like light or temperature, change, because the organic compounds merely physically are adsorbed by the activated carbon. Thus, saturated activated carbon should be disposed in landfill or incinerated without recovery of the organic compounds, so that using activated carbon costs much and the organic compounds can not be reused. Besides, when the activated carbon is saturated, the adsorbing processes will be stopped for replacing absorbent, such that the treatment is not continuous.

Taiwan Patent Issue No. 446572 entitled "APPARATUS AND METHOD FOR UV OXIDATION AND MICROBIOLOGICAL DECOMPOSITION OF ORGANIC WASTE AIR" is another example of a conventional apparatus for treating exhaust and discloses a first UV oxidation reactor, a humidifying device, an acid neutralizing device and a biofilter. The first UV oxidation reactor includes an UV lamp for organic pollutants irradiation and a first monitoring device for detecting the concentration of the organic pollutants. The humidifying device and the acid neutralizer device has a specific function to humidify the organic waste air and neutralize the acidity of the organic waste air respectively. The biofilter contains biosolids with microorganisms capable of metabolizing or biodegrading one or more organic compounds and is used for treating residual pollutants after the first UV oxidation reactor. Therefore, an organic pollutant in organic waste air is photo-oxidized to reduce the concentration of the organic pollutant.

However, these past developed apparatuses for treating exhaust gas are based on the degradative oxidation reactions of organic pollutants by irradiating UV light. If some usable compounds, such as vinyl monomer, exist in the organic waste air, their degradation also occurs. Although an oxidant or a catalyst like ozone or titanium dioxide may be added in the first UV oxidation reactor, degradation of organic pollutant is enhanced without recovery the usable compounds in the organic waste air. Furthermore, amount of free radicals for decomposition of organic pollutants and generated from the catalyst of $TiO_2$ is decreased to low efficiency of degradation of the organic pollutants, while $TiO_2$ is exposed to light outside the first UV oxidation reactor. Hence, there is a need for an improvement over the conventional apparatus for treating exhaust.

SUMMARY OF THE INVENTION

The primary objective of the present invention is to provide a method for the treatment of exhaust gas, which solves the problems of the prior art described above to allow vinyl monomer recovery by polymerization and reduction of consumption of energy by photocatalytic reaction.

To accomplish the above objective, the present invention provides a method for removing vinyl monomers from a gas stream. The method for removing vinyl monomers from a gas stream according to the preferred teachings of the present invention includes the steps of: irradiating a photoactive-inorganic medium by a light emitting unit to activate the photoactive-inorganic medium; and pumping a gas stream including vinyl monomers to contact with the activated photoactive-inorganic medium to make the vinyl monomers in the gas stream to polymerize on the photoactive-inorganic medium and jointly form a polymeric nano-composite. Accordingly, recovery of vinyl monomers is achieved and vinyl monomers can be reused in the future.

Further scope of the applicability of the present invention will become apparent from the detailed description given hereinafter. However, it should be understood that the detailed description and specific examples, while indicating preferable embodiments of the invention, are given by illustrations only, since various will become apparent to those skilled in the art from this detailed description.

BRIEF DESCRIPTION OF THE DRAWINGS

The present invention can be fully understood from the detailed description given herein below and the accompanying drawings which are given illustrations only, and thus are not limitative of the present invention, and wherein.

Figure 1:
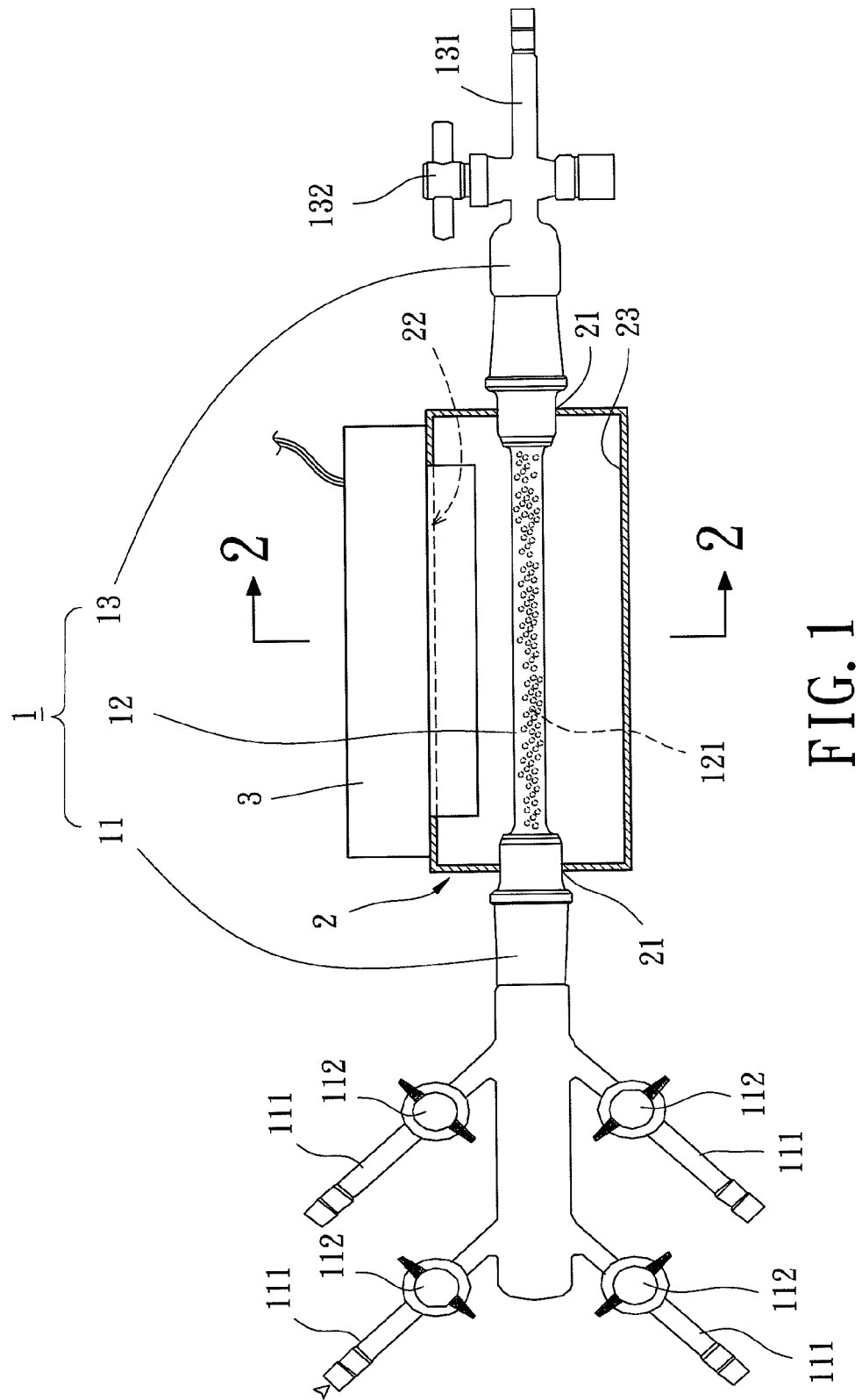
FIG. 1 is a side view illustrating an apparatus for removing vinyl monomers from a gas stream in accordance with a first embodiment of the present invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions that conform to specify the forces of weight, strength, and similar requirements will likewise be within the skill of the art after the following teachings of the present invention have been read and understood.

Where used in the various figures of the drawings, the same numerals that designate the same or similar parts. Furthermore, when the terms "first", "second", "inner", "outer", "lower", "end", "portion", "axial", "radial", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

Figure 2:
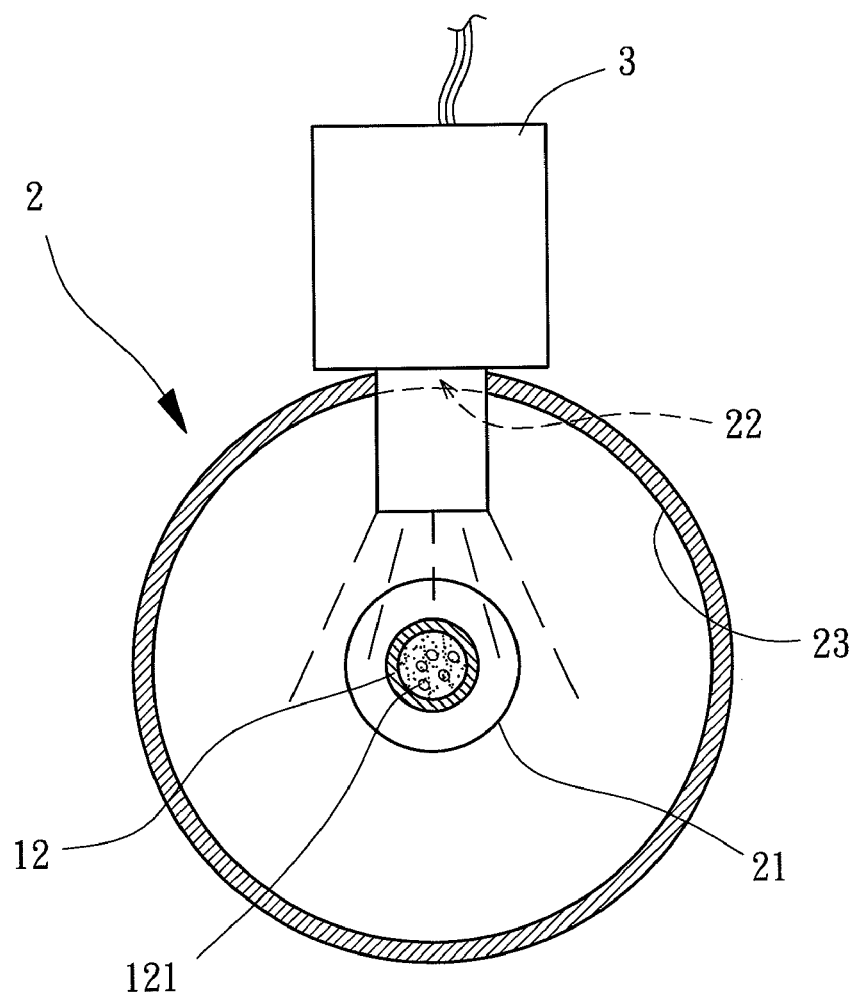
FIG. 2 is a partial, cross sectional view of the apparatus of FIG. 1 according to section line 2-2 of FIG. 1.

An apparatus for removing vinyl monomers from a gas stream of a first embodiment according to the preferred teachings of the present invention is shown in FIGS. 1 and 2 of the drawings. According to the first embodiment form shown, the apparatus for removing vinyl monomers from a gas stream includes a tube 1, a shading casing 2 and a light emitting unit 3 for irradiating inside the shading casing 2, with the tube 1 being partially received in the shading casing 2.

Referring again to FIGS. 1 and 2, the tube 1 of the first embodiment according to the preferred teachings of the present invention is made of materials those does not react with gas, such as glass, quartz or metal. The tube 1 includes a first section 11, a second section 12 with one end thereof coupling to the first section 11, and a third section 13 coupling to the other end of the second section 12; that is, the three sections 11, 12, 13 sequentially link together, with the second section 12 connecting between the first and third sections 11, 13. The first section 11 has at least one connecting port 111 with an opening and at least one first controlling valve 112. In this embodiment, an amount of the connecting port 111 is equal to that of the first controlling valve 112, which are both four, as shown in FIG. 1, with each first controlling valve 112 being mounted on each connecting port 111. Specifically, each of the connecting ports 111 is used for a gas stream to enter the first section 11 through the openings of the connecting ports 111 while one of the connecting ports 111 is linked to a gas source (not illustrated), or for a gas inside the tube 1 to be exhausted while one of the connecting ports 111 is linked to an exhauster like a motor (not illustrated). Besides, the controlling valves 112 are used to control flow rate of the gas flowing into or out of the tube 1. There is a photoactive-inorganic medium 121 arranged inside the second section 12, and preferably the photoactive-inorganic medium 121 is coated on an inner surface of the second section 12 or is in the form of a plurality of particles packed in the second section 12. Hence, the photoactive-inorganic medium 121 is selected from Nano-TiO$_2$, Carbon Nanotubes (CNTs), Nano-Ag, Nano-Au, Nano-Cu, Nano-Pt or Nano-Fe. Seen in FIGS. 1 and 2, the photoactive-inorganic medium 121 is in the form of a plurality of Nano-TiO$_2$ particles packed in the second section 12. The third section 13 has an outlet 131 at a free end thereof without contacting the second section 12, through which gas inside the tube 1 flows out. A second controlling valve 132 is mounted close to the outlet 131 to control flow rate of the gas flowing out of the tube 1 through the outlet 131.

The shading casing 2 of the first embodiment according to the preferred teachings of the present invention surrounds the second section 12 to shade the second section 12 from light of outer space, with the second section 12 being received and sealed in the shading casing 2, such that light outside the shading casing 2 entering the second section 12 to affect function of the photoactive-inorganic medium 121 is avoided. The shading casing 2 is preferred a hollow cylinder, and an inner radial surface of the shading casing 2 and an outer radial surface of the second section 12 are spaced an interval apart. Furthermore, the shading casing 2 has two through holes 21 at two opposite ends thereof, which the tube 1 will pass through, an assembling hole 22 formed in a radial wall thereof, and a reflecting face 23 that is defined by the inner surface of the shading casing 2. In detail, the inner surface of the shading casing 2 is daubed with white paint or attached with white cloth or paper to form the reflecting face 23.

The light emitting unit 3 of the first embodiment according to the preferred teachings of the present invention is mounted on the shading casing 2 via the assembling hole 22, with the light emitting unit 3 sealing the assembling hole 22. The light emitting unit 3 is able to emit UV or visible light. In the first embodiment, the light emitting unit 3 is able to emit UV light to activate the photoactive-inorganic medium 121.

Figure 3:
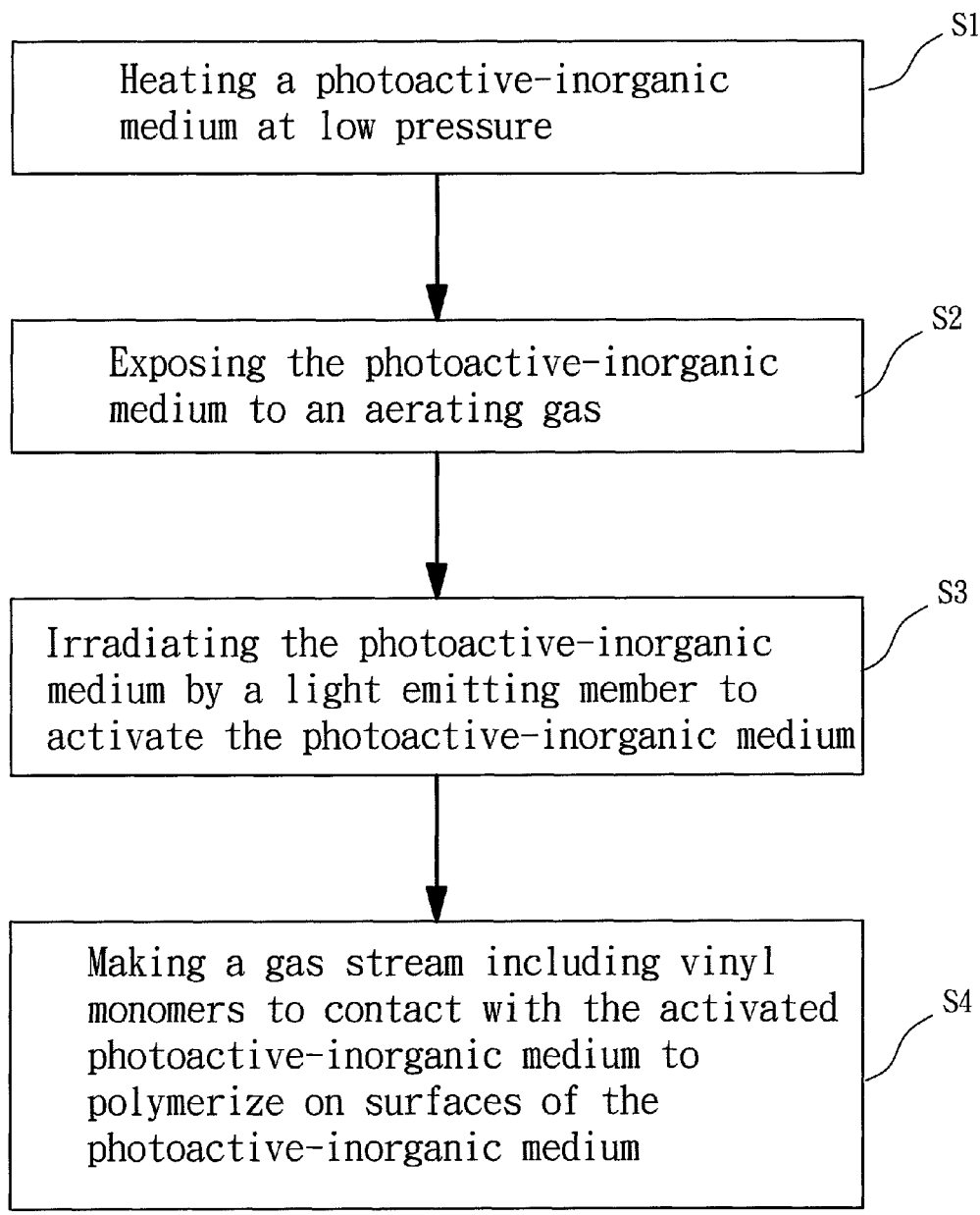
FIG. 3 is a block diagram illustrating a method for removing vinyl monomers from a gas stream in accordance with a preferred embodiment of the present invention.

Now turning to FIGS. 1 through 3, a method for removing vinyl monomers from a gas stream by using the apparatus of the first embodiment includes the following steps. First, a pretreatment of the photoactive-inorganic medium 121 designated as step "S1" is proceeded, which is heating the photoactive-inorganic medium 121 at low pressure. Specifically, the photoactive-inorganic medium 121 of a predetermined amount, for example a weight of 0.6 g, is received in the second section 12 and the second section 12 is heated by a heater (not illustrated) to rid the photoactive-inorganic medium 121 of water molecules and oxygen adsorbed thereon, such that function of the photoactive-inorganic medium 121 is prevented from being influenced by moisture. And then the connecting ports 111 are linked to a polluted gas source, an exhauster and an aerating gas source respectively (not illustrated), with one of the connecting ports 111 being closed and without linked. Only the exhauster is turned on to pump air out of the tube 1, so that the inside of the second section 12 can be in a pressure lower then 400 torr or close to vacuum (lower than 0.1 torr). Thus, the impurity in air that is originally inside the tube 1 influencing efficiency of removing vinyl monomers from a gas stream is avoided. Besides, an aerating gas released from the aerating gas source is selected from a group consisting of nitrogen, oxygen, helium, carbon dioxide, ozone and mixtures thereof, wherein nitrogen is preferred in this embodiment.

After step "S1" is aeration of the tube 1 designated as step "S2", which is exposing the photoactive-inorganic medium 121 to the aerating gas. In detail, the controlling valve 112 mounted to the port 111 linked to the aerating gas source is opened to allow entry of nitrogen gas into the tube 1, so that water vapor in the tube 1 is further removed to reduce moisture of the photoactive-inorganic medium 121. In addition, the flow rate of the aerating gas ranges from 1 mL/min to 1500 mL/min, preferably from 10 mL/min to 20 mL/min, and aeration time ranges from 1 to 36000 mins, preferably from 10 to 20 mins.

Still referring to FIGS. 1 through 3, following the step "S2" is step "S3" of irradiated activation of the photoactive-inorganic medium 121, in which the photoactive-inorganic medium 121 is irradiated by the light emitting unit 3, so as to be activated. In detail, the light emitting unit 3 is switched on to activate the photoactive-inorganic medium 121 after the aerating gas is stopped from being into the tube 1. The following equation (1) shows an activation reaction of the photoactive-inorganic medium 121 (Nano-TiO$_2$). Moreover, the photoactive-inorganic medium 121 is irradiated for 1 minute to 86400 minutes and preferably from 0.1 to 5 hours.

$$\text{Nano-TiO}_2 + h\upsilon \rightarrow \text{Nano-TiO}_2^* \qquad (1)$$

Finally, a polymerization process designated as step "S4" is proceeded, in which a gas stream including vinyl monomers contacts with the activated photoactive-inorganic medium 121, so that vinyl monomers in the gas stream can join together on the surfaces of the particles of the photoactive-inorganic medium 121 to form polymeric nano-composites. Specifically, while the gas stream including vinyl monomers flows into the second section 142 through the first section 11, vinyl monomers in the gas stream are initiated by the activated photoactive-inorganic medium 121 to polymerize on surfaces of the particles of the photoactive-inorganic medium 121, as the following equation (2) shown. Hence, the photoactive-inorganic medium 121 and the polymers thereon jointly form polymeric nano-composites. By the method of the present invention, vinyl monomers in the gas stream can be recovered and reused in the form of the polymeric nano-composites.

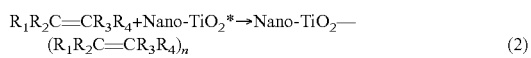

$$R_1R_2C=CR_3R_4 + \text{Nano-TiO}_2^* \rightarrow \text{Nano-TiO}_2 - (R_1R_2C=CR_3R_4)_n \qquad (2)$$

Furthermore, the gas stream including vinyl monomers contacts with the photoactive-inorganic medium 121 for a period of time ranging from 1 to 1440 minutes, and preferably from 30 to 110 minutes. The step "S4" of polymerization process and step "S3" of irradiated activation are proceeded under the condition of being shading from light of outer space, namely, in the shade of the shading casing 2, and the step "S4" is proceeded in the dark with switching off of the light emitting unit 3. It is noted that "vinyl monomer" is the term for any organic compound having a vinyl group, for example, ethylene, propylene, butadiene, styrene and stilbene. Seeing formula "1" that is the chemical structure of vinyl monomer, R, R', R" and R''' are selected from H, CH$_3$, CH$_3$CH$_2$ or other organic substituents. Additionally, R" may be the same as R''', and all of R, R', R" and R''' may be H at the same time.

Formula "1":

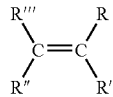

Figure 4:
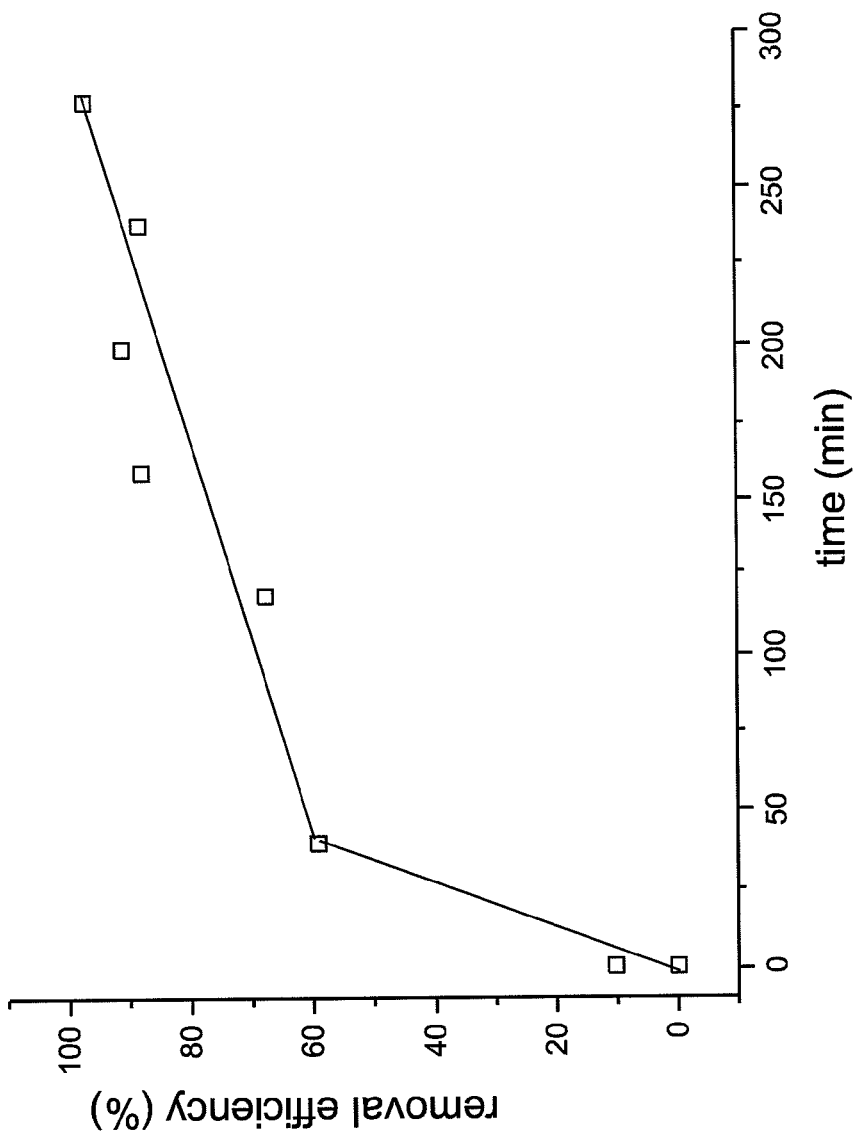
FIG. 4 is a diagram illustrating variations in styrene removal efficiency with time.

Taking styrene for example, a gas stream with styrene is pumped into the tube 1, and then vinyl monomers in the gas stream are effectively removed as shown in FIG. 4 illustrating styrene removal efficiency with time after the gas stream's being pumped, wherein the gas stream is formed by pumping nitrogen gas into a styrene solution because the boiling point of styrene is 98° C. If the boiling point of a chemical that is desired to be removed from a gas stream approximates or is lower than room temperature, the process described above for generating gaseous vinyl monomers is not needed.

Since it is known that polymeric nano-composites have enhanced properties, polymeric nano-composites produced by the present invention can be extensively used in the field of science and technology, the material of vehicle crash bars for instance.

Figure 5:
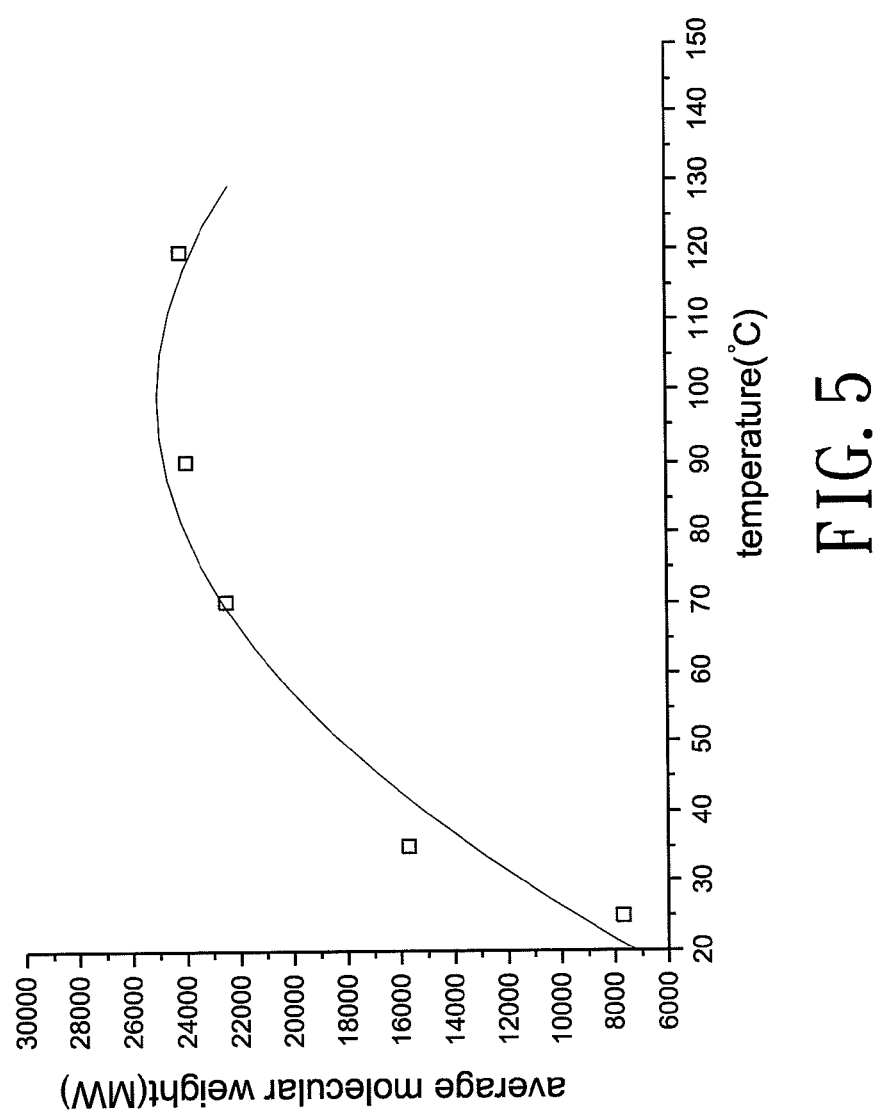
FIG. 5 is a diagram illustrating variations in molecular weights of polymers on a photoactive-inorganic medium of the apparatus of the present invention with temperature.

Referring to FIG. 5, molecular weights of the polymerized vinyl monomers on the polymeric nano-composites produced by the present invention increase with rising the temperature in the inside of the second section 12. Therefore, vinyl monomers indeed can be recovered effectively to form polymeric nano-composites by the method and apparatus for removing vinyl monomers from a gas stream of the present invention.

Figure 6:
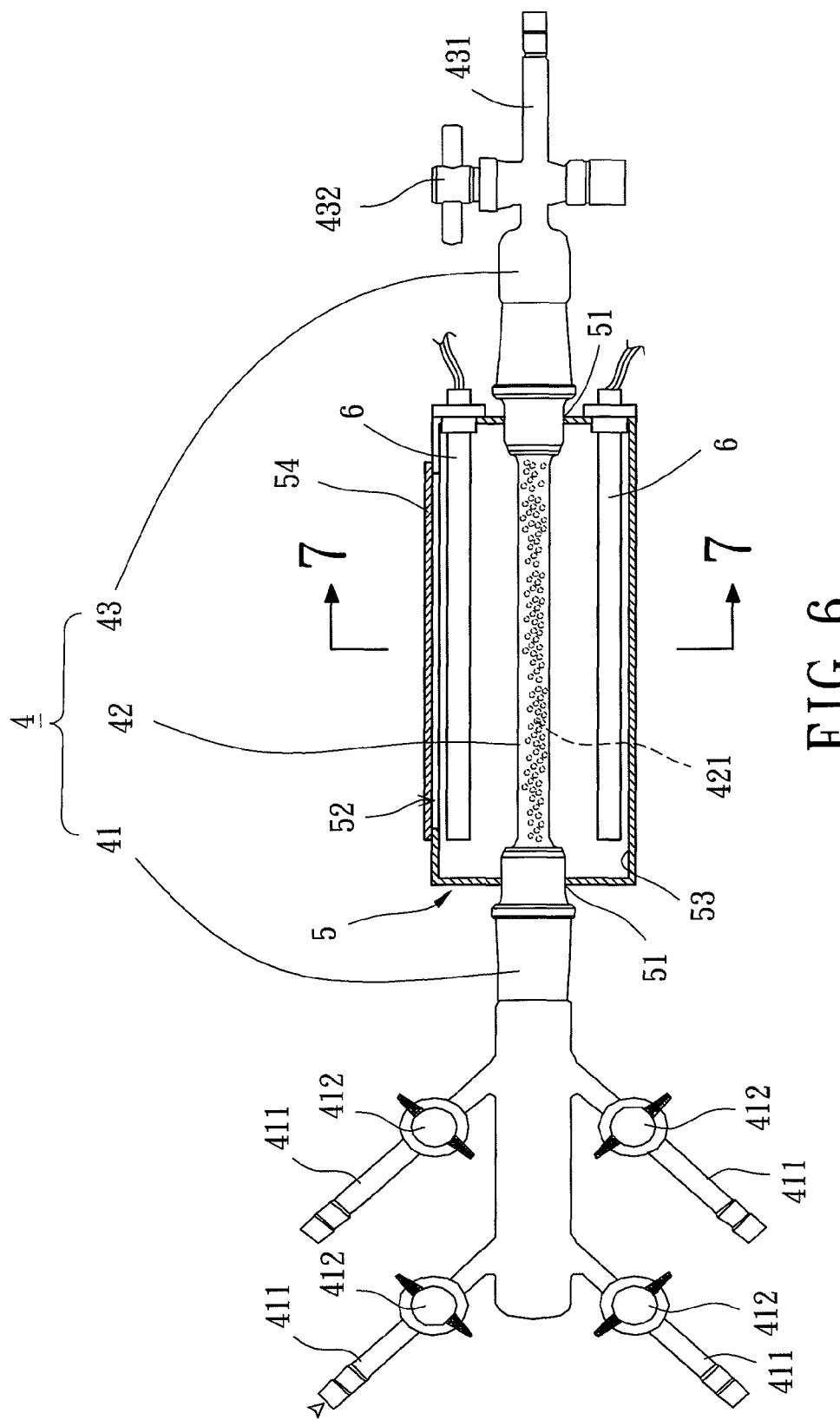
FIG. 6 is a side view illustrating an apparatus for removing vinyl monomers from a gas stream in accordance with a second embodiment of the present invention.
Figure 7:
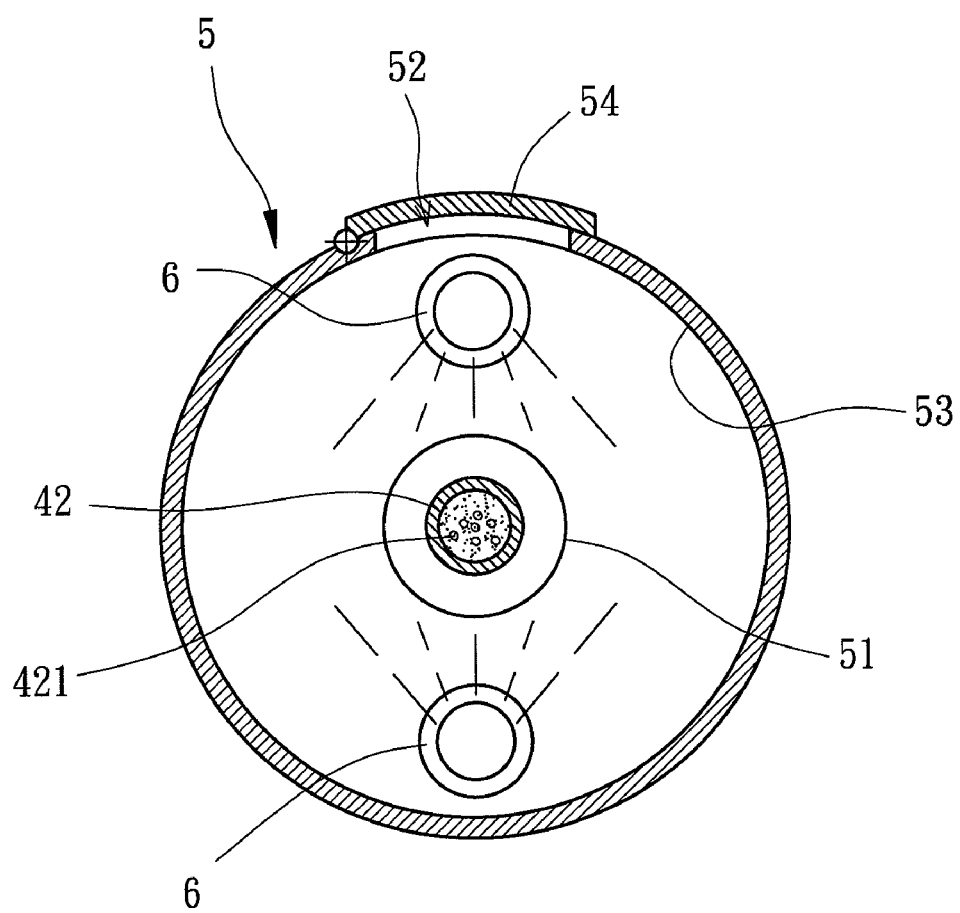
FIG. 7 is a partial, cross sectional view of the apparatus of FIG. 6 according to section line 7-7 of FIG. 6.

FIG. 6 shows an apparatus for removing vinyl monomer from a gas stream of a second embodiment according to the preferred teachings of the present invention. In the preferred form shown, the apparatus includes a tube 4 having a first section 41, a second section 42 and a third section 43, a shading casing 5 and two light emitting units 6. The first section 41 has a plurality of connecting ports 411 and a plurality of first controlling valve 412 mounted to the connecting ports 411. There is a photoactive-inorganic medium 421 in the form of particles inside the second section 12. The third section 43 has an outlet 431 at one end thereof and a second controlling valve 432 is mounted close to the outlet 131. The shading casing 5 has two through holes 51 at two opposite ends thereof, an assembling hole 52 formed in a radial wall thereof, and a reflecting face 53. The major difference between the first embodiment and the second embodiment is shown as the following. There is further a lid 54 covering the assembling hole 52, with one side of the lid 54 pivotably coupling to the shading casing 5 close to the assembling hole 52. The light emitting units 6 are disposed inside the shading casing 5 through the assembling hole 52, with the light emitting units 6 being at two opposite sides of the second section 42. By this arrangement, the photoactive-inorganic medium 421 inside the second section 42 can be irradiated evenly by the light emitting units 6 to assure and accelerate activation of the photoactive-inorganic medium 421.

As has been discussed above, the second section 12 or 42 is encased in the shading casing 2 or 5 to prevent light of outer space, such that influence of the light of outer space on the photoactive-inorganic medium 121 or 421 is avoided. Furthermore, the photoactive-inorganic medium 121 or 421 activated by the light emitting units 3 or 6 can make vinyl monomers in the gas stream to polymerize and attach to the surfaces of the photoactive-inorganic medium 121, so as to continuously remove and recover vinyl monomers in the gas stream. Consequently, recovery of a usable portion of waste is allowed, and the used and saturated photoactive-inorganic medium 121 or 421 can be utilized as polymeric nano-composites in the future instead of being regenerated or thrown away which implies extra costs and makes the usable portion of the waste to become useless.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for removing vinyl monomers from a gas stream comprising the steps of:
   irradiating a photoactive-inorganic medium by a light emitting unit to activate the photoactive-inorganic medium, wherein the photoactive-inorganic medium is irradiated by light from the light emitting unit, and the gas stream including vinyl monomers contacts with the activated photoactive-inorganic medium in the dark after turning of the light emitting unit; and
   pumping the gas stream including vinyl monomers to contact with the activated photoactive-inorganic medium to make the vinyl monomers in the gas stream to polymerize on the photoactive-inorganic medium to jointly form a polymeric nano-composite.

2. The method for removing vinyl monomers from a gas stream as defined in claim 1, wherein a step of aerating the photoactive-inorganic medium by an aerating gas is added before irradiating the photoactive-inorganic medium for reducing moisture of the photoactive-inorganic medium.

3. The method for removing vinyl monomers from a gas stream as defined in claim 2, wherein a step of heating the photoactive-inorganic medium in low pressure lower than 1 atm is added before aerating the photoactive-inorganic medium.

4. The method for removing vinyl monomers from a gas stream as defined in claim 1, wherein vinyl monomer is selected from ethylene, propylene, butadiene, styrene or stilbene.

5. The method for removing vinyl monomers from a gas stream as defined in claim 1, wherein vinyl monomer has a chemical structure as the following, with R, R', R" and R'" being selected from H, $CH_3$ or $CH_3CH_2$.

6. The method for removing vinyl monomers from a gas stream as defined in claim 1, wherein the light emitting unit is able to emit UV light or visible light.

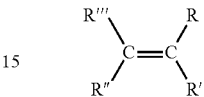

7. The method for removing vinyl monomers from a gas stream as defined in claim 1, wherein the photoactive-inorganic medium is irradiated for 1 minute to 86400 minutes.

8. The method for removing vinyl monomers from a gas stream as defined in claim 1, wherein the gas stream including vinyl monomers contacts with the photoactive-inorganic medium for a period of time ranging from 1 minutes to 1440 minutes.

9. The method for removing vinyl monomers from a gas stream as defined in claim 2, wherein the aerating gas is selected from a group consisting of nitrogen, oxygen, helium, carbon dioxide, ozone and mixtures thereof.

10. The method for removing vinyl monomers from a gas stream as defined in claim 2, wherein the photoactive-inorganic medium is aerated by the aerating gas for an aeration time ranging from 1 minute to 36000 minutes.

11. The method for removing vinyl monomers from a gas stream as defined in claim 1, wherein the photoactive-inorganic medium is selected from Nano-$TiO_2$, Carbon Nanotubes (CNTs), Nano-Ag, Nano-Au, Nano-Cu, Nano-Pt or Nano-Fe.

* * * * *